P. E. WILLFORD.
Animal-Trap.

No. 214,013. Patented April 8, 1879.

Witnesses:

Inventor:
Presley E. Willford
by Humphrey & Stuart
Attorneys.

UNITED STATES PATENT OFFICE.

PRESLEY E. WILLFORD, OF GREEN TOWNSHIP, WAYNE COUNTY, ASSIGNOR OF ONE-HALF HIS RIGHT TO SAMUEL E. WILLFORD, OF COPLEY, OHIO.

IMPROVEMENT IN ANIMAL-TRAPS.

Specification forming part of Letters Patent No. 214,013, dated April 8, 1879; application filed February 23, 1878.

*To all whom it may concern:*

Be it known that I, PRESLEY E. WILLFORD, of Green township, in the county of Wayne and State of Ohio, have invented a new and useful Improvement in Animal-Traps, of which the following is a specification.

My invention relates to that class of ever-set traps wherein a suspended platform is employed which sinks by the weight of the animal and prevents his escape except into an inner apartment.

Such traps have ordinarily been so constructed that the entire or greater part of the space about the top of the apartment wherein the platform is suspended is open when set, and closed by a cover connected and descending with the platform, and the opening into the inner apartment is guarded by wires or a door that is raised by the animal pressing against it and closed by its own weight. But the first part of the foregoing arrangement is objectionable, as it affords too great facilities for the animal to escape when it discovers that the platform is sinking, while the latter part offers obstructions to the free passage of the animal to the inner apartment, and is also liable to stick or get out of order.

The object of my invention is to lessen the chances of escape to the animal when the platform begins to descend, and also to leave the entrance into the inner apartment free when the animal passes, and closed at all other times.

The trap consists of a rectangular oblong box, the size depending upon the class of animals it is desired to capture, divided by suitable partitions into three apartments, with openings in the partitions for the animal to pass, the first apartment being provided with a false bottom, suspended above the floor thereof by a balance-weight, so arranged that the animal entering from the outside upon the false bottom causes, by its weight, said false bottom to descend, closing the outer entrance and opening the entrance into the second apartment, through which the animal passes, when the false bottom again rises, opening the outer entrance and closing the entrance to the second apartment; and the entrance to the third apartment is guarded by inwardly-projecting wires, which prevent a return therefrom when the animal has once entered.

Figure 1:
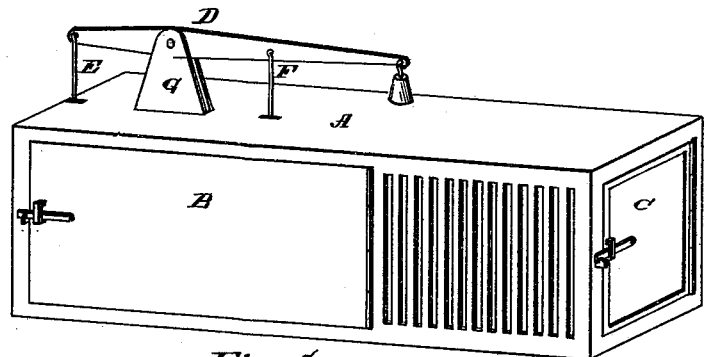
Figure 2:
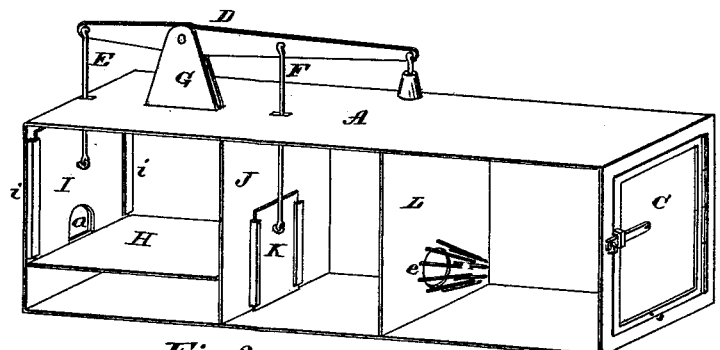

In the accompanying drawings, Figure 1 is a perspective view of the exterior of said trap; Fig. 2, the same with the side removed to show the interior arrangement; and Fig. 3, a similar view, looking from the opposite.

Similar letters of reference indicate like parts; and, for the purpose of this description, the end wherein the animal enters is called the front.

The box A, preferably of metal, is divided into three apartments by the partitions J L. Within the front apartment is a false bottom or platform, H, from the front edge of which arises a plate, I, which, running in guides $i\ i$, holds the platform H horizontal. This platform is held upward by a rod, E, attached to one end of the lever D, which latter is journaled in the supports G, and has a balance-weight upon its farther end.

An opening, $a$, in the plate I coincides, when the platform H is raised, with a corresponding opening in the front of the trap.

Figure 3:
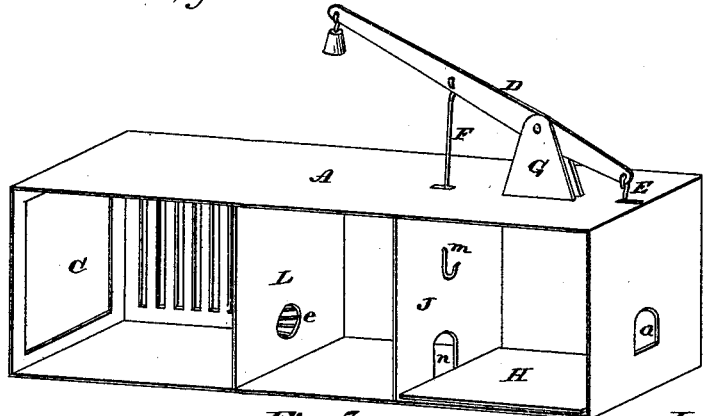

In operation, as the animal enters upon the platform H to seek the bait placed upon the hook $m$, his weight causes the platform H and plate I to descend, thereby closing the opening $a$, as shown in Fig. 3. At the same time the door K, which closes the opening $n$ in the partition J, being attached by the wire F to the lever D, is raised, and the animal seeking to escape enters the second apartment, when the platform H, relieved of the weight of the animal, resumes its former position, opening the orifice $a$ and closing the opening $n$.

The apartment between the partitions J L is dark, while the third apartment, having grated or barred sides, is light, and the animal in his efforts to escape seeks the light, passes through the opening $e$, through which inwardly-projecting wires prevent his escape.

A door, C, permits the animals to be removed, and the door B gives access to the interior of the trap for baiting the trap, &c.

I am aware that a sinking platform connected with a door through the medium of a lever is of itself not new, such a device being mentioned in the patent to E. Brown of May 4, 1869; but in that case the door closes the outer entrance to the trap, the only function performed by the platform being to reopen the door after the animal is caught, and such is not my invention; but

What I claim is—

1. In an animal-trap, a vertically-moving platform, H, carrying with it and operating a vertically-moving gate, I, to close and open the ingress, and also operating, by intermediate connections, such substantially as shown, a vertically-moving gate, K, to open and close the exit, the motion of the gates being simultaneously in opposite directions, substantially as described.

2. In an animal-trap, the vertically-moving platform H and gate I, suspended from one end of the lever D, and the vertically-moving gate K, suspended from the other end of the lever D, in combination with the apartment having ingress and egress holes opened and closed alternately by the simultaneous movements of the gates in opposite directions, substantially as hereinbefore set forth.

PRESLEY E. WILLFORD.

Witnesses:
C. H. MYERS,
JOSEPH WILLFORD.